(12) United States Patent
Irizarry

(10) Patent No.: US 6,785,566 B1
(45) Date of Patent: Aug. 31, 2004

(54) CELLULAR TELEPHONE CASE

(76) Inventor: Louis Irizarry, 671 Villa St., Daly City, CA (US) 94014-3050

(*) Notice: Subject to any disclaimer, the term of this patent is extended or adjusted under 35 U.S.C. 154(b) by 384 days.

(21) Appl. No.: 10/066,812

(22) Filed: Feb. 4, 2002

(51) Int. Cl.[7] ................................................. H04B 1/38
(52) U.S. Cl. ................................. 455/575.8; 455/575.1
(58) Field of Search ........................... 383/66, 59, 106, 383/108, 113; 455/550.1, 575.1, 575.2, 575.3, 575.4, 575.5, 575.6, 575.7, 575.8, 575.9, 90.3, 351, 128, 347, 899; 379/441, 447, 446, 451, 452, 453, 457, 437; D14/137, 138, 140, 144, 155, 188, 204, 265, 299; D3/218; 224/929, 930, 191; 206/253, 701, 775, 776, 521; 361/679

(56) References Cited

U.S. PATENT DOCUMENTS

| | | | | |
|---|---|---|---|---|
| 3,989,909 A | * | 11/1976 | Hodsdon et al. ............ | 381/391 |
| 4,006,764 A | * | 2/1977 | Yamamoto et al. ......... | 206/320 |
| 4,649,453 A | * | 3/1987 | Iwasawa ..................... | 360/137 |
| 4,727,599 A | * | 2/1988 | Rappaport et al. .......... | 455/351 |
| 4,771,927 A | * | 9/1988 | Ventura ....................... | 224/666 |
| 5,231,659 A | * | 7/1993 | Abraham et al. ...... | 379/433.03 |
| 5,383,091 A | | 1/1995 | Snell ........................... | 361/679 |
| D368,581 S | | 4/1996 | Cincotta ..................... | D3/218 |
| 5,625,688 A | * | 4/1997 | Ford et al. ............. | 379/433.09 |
| 5,706,940 A | * | 1/1998 | Amarello .................... | 206/320 |
| D404,197 S | | 1/1999 | Dobbins ..................... | D3/230 |
| 5,896,453 A | * | 4/1999 | Speaks ................. | 379/433.01 |
| 5,897,040 A | * | 4/1999 | Ward .......................... | 224/413 |
| 6,043,747 A | * | 3/2000 | Altenhofen .............. | 340/573.1 |
| D425,297 S | | 5/2000 | Joseph et al. ................ | D3/218 |
| D427,429 S | | 7/2000 | Rains .......................... | D3/215 |
| 6,082,535 A | | 7/2000 | Mitchell ..................... | 206/320 |
| 6,092,707 A | | 7/2000 | Bowes ........................ | 224/435 |
| 6,115,597 A | * | 9/2000 | Kroll et al. .............. | 455/404.1 |
| 6,130,945 A | * | 10/2000 | Shin ........................... | 379/455 |
| 6,349,824 B1 | * | 2/2002 | Yamada .................. | 206/316.1 |
| 2002/0193136 A1 | * | 12/2002 | Halkosaari et al. ......... | 455/550 |
| 2003/0068035 A1 | * | 4/2003 | Pirila et al. ................. | 379/447 |
| 2004/0014506 A1 | * | 1/2004 | Kemppinen .............. | 455/575.1 |

* cited by examiner

Primary Examiner—Vivian Chin
Assistant Examiner—Raymond B. Persino
(74) Attorney, Agent, or Firm—Goldstein Law Offices, P.C.

(57) ABSTRACT

A cellular telephone casing, for enclosing and protecting a cellular telephone without interfering with the normal functionality of the cellular telephone, the casing having walls made of vinyl covered foam which define an interior volume for fully enclosing the cellular telephone in a substantially waterproof protective covering. The casing has speaker wells and microphone wells which allow uninhibited communication with the telephone through the casing, but are selectively filled with a speaker plug and microphone plug when the telephone is not in use to maintain waterproofing of the casing. At least one transparent window is provided to allow buttons of the telephone to be operated and displays to be visualized. A top split and side splits allow the cellular telephone to be inserted into the casing, and an overhead strap and side straps selectively maintain the top split and side splits closed to maintain waterproofing of the case.

6 Claims, 4 Drawing Sheets

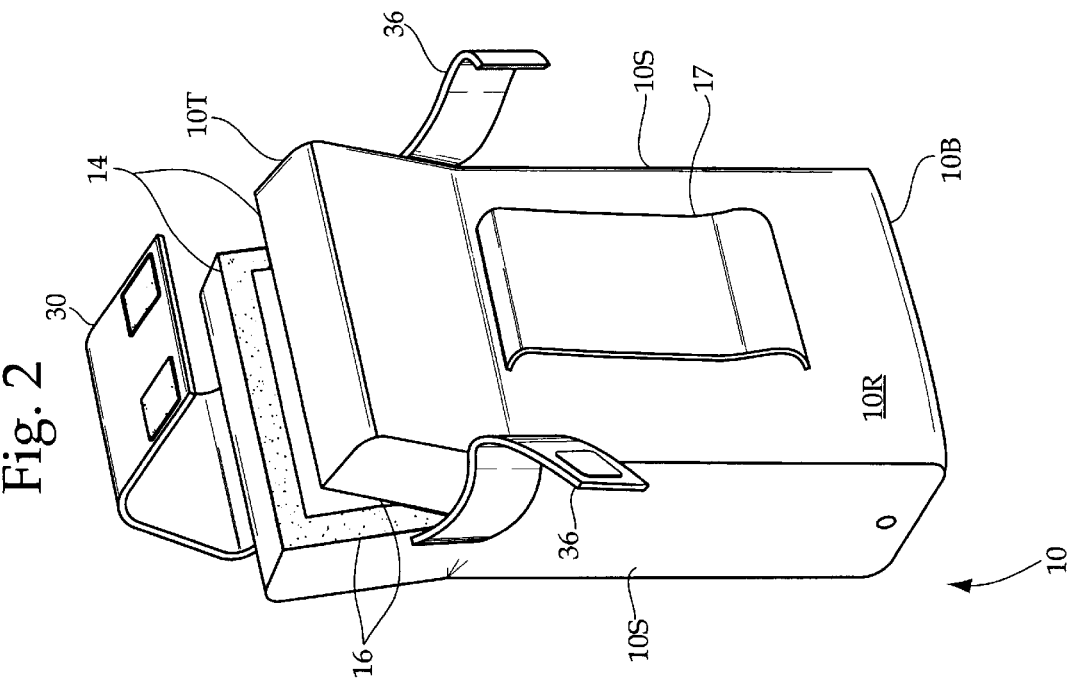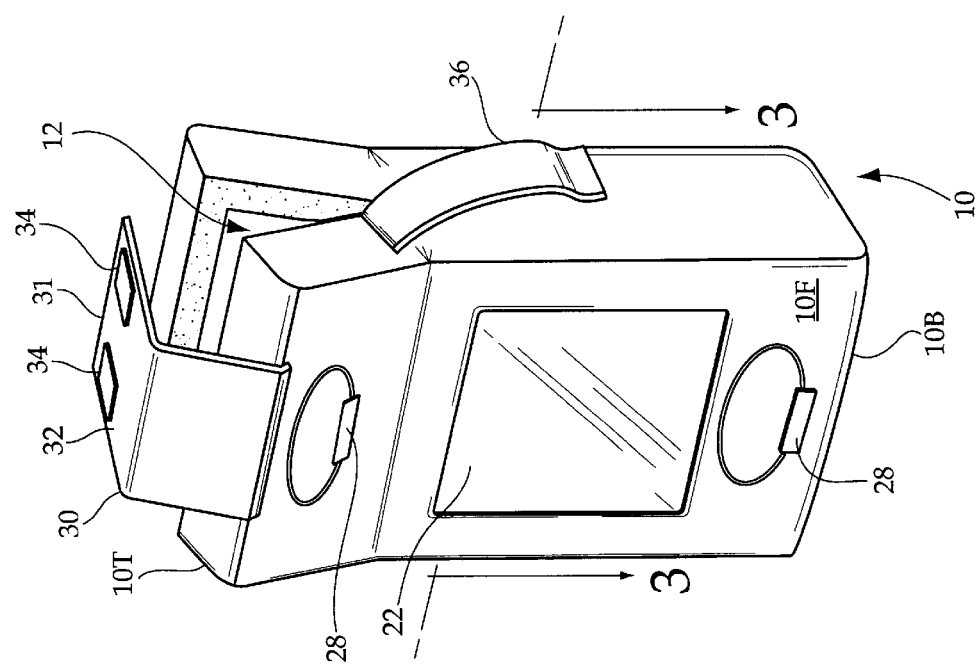

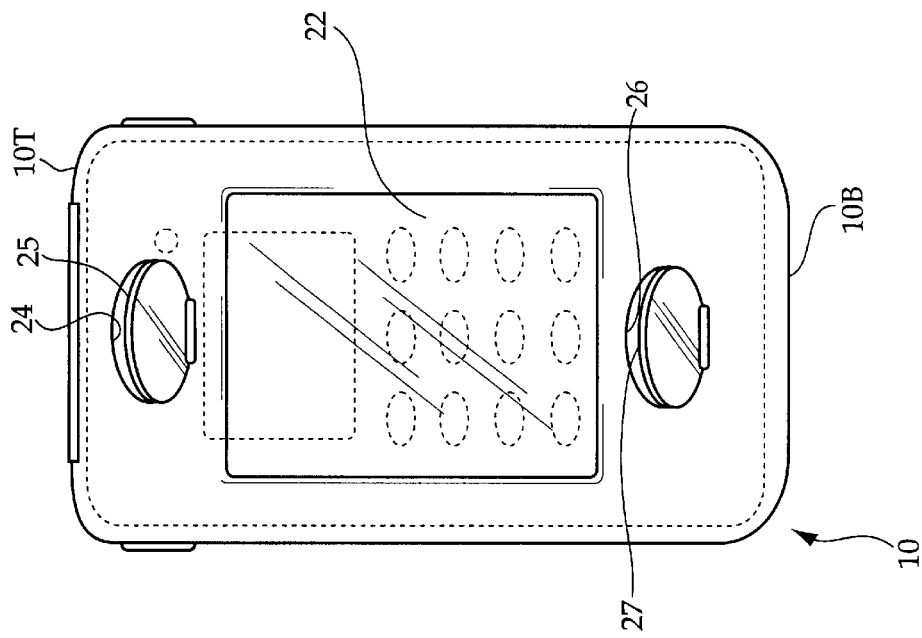
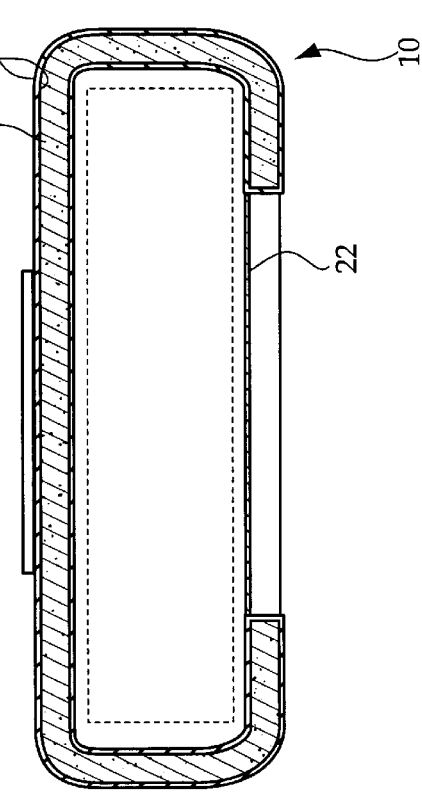
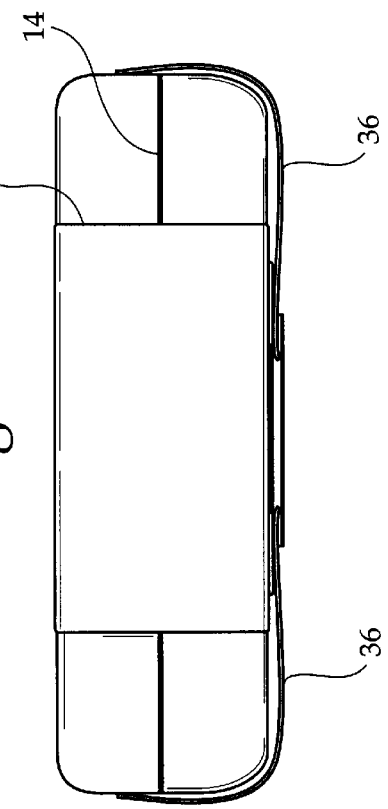

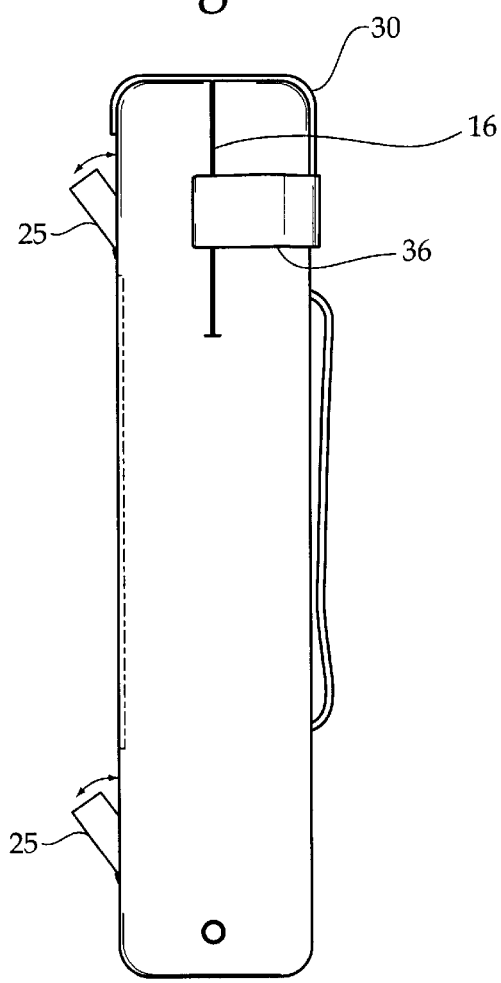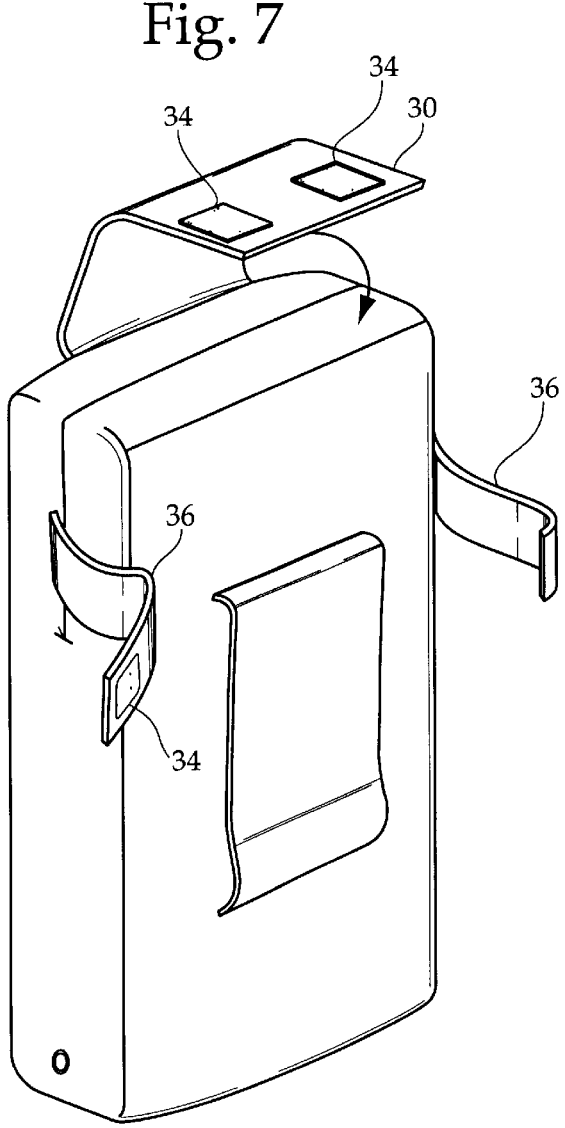

10

CELLULAR TELEPHONE CASE

BACKGROUND OF THE INVENTION

The invention relates to a cellular telephone case. More particularly, the invention relates to a housing which fully encloses a cellular telephone, protecting it from damage, while not interfering with the normal functionality of the telephone.

A mere decade ago, cellular telephone owners were a minority of the population. Today, cellular telephone ownership transcends age and economic boundaries. Nearly everyone has a cellular telephone—business executives as well as homemakers, school age children to senior citizens.

With such a vast segment of the population owning cellular telephones, it is perhaps the most universally carried "personal item". However, with so many people carrying their cellular telephones with them at all times, the incidence of damage and destruction of the same is astronomically high.

To some extent, manufacturers seek to make the cellular telephone "tough"—such that it is perhaps able to withstand an ordinary fall onto the floor. However, a fall onto a hard surface will certainly at least scratch the phone. Further, according to the configuration of the telephone, a fall on the wrong angle can break the antenna, crack the display, and even break a button or two. Also, repeated drops, or a drop from a greater height can crack the casing, or damage internal electronic circuitry such that the telephone is rendered inoperable.

In addition, cellular telephones are very easily damaged by water. A cellular telephone dropped in a pool, a bath tub, or even a sink filled with water is generally ruined.

Although the purchase cost of cellular telephones has dropped dramatically in recent years, the replacement cost is often significant. Because the actual purchase price is typically subsidized by a "carrier" because the customer is making a long term commitment for cellular service with the carrier, repairing or replacing the telephone is often at the mercy of the carrier. In many cases, even once a telephone is destroyed, the customer is forced to continue paying monthly fees to the carrier.

Some have proposed devices that seek to protect a cellular telephone from damage. By way of example, U.S. Pat. No. 5,383,091 to Snell discloses a grip and protective casing for a cellular telephone. Although Snell provides limited protection by covering the sides and rear of the cellular telephone, it does not protect the front of the telephone, nor does it provide any reasonable protection against water penetrating the telephone.

Others have proposed devices which seek to fully protect the telephone, both from impact and water damage. For example, U.S. Pat. No. 6,092,707 to Bowes, Jr. discloses a shock and weather protective mobile telephone case which fully encloses the telephone within a weather protective hard shell case. Although Bowes clearly provides significant protection, it in no way allows the telephone to be operating without first opening the case and removing the telephone. It is not clear that one would even hear the telephone ring while it is in the case. U.S. Pat. No. 6,082,535 to Mitchell and Des. 425,297 to Joseph et al. have similar failings.

While these units may be suitable for the particular purpose employed, or for general use, they would not be as suitable for the purposes of the present invention as disclosed hereafter.

SUMMARY OF THE INVENTION

It is an object of the invention to produce a cellular telephone casing which effectively protects the telephone from damage due to impact, drops, and rough handling. Accordingly, the cellular telephone case encases the cellular telephone in a foam housing which absorbs undue forces resulting from impacts, drops, and rough handling from reaching the telephone.

It is another object of the invention to provide a cellular telephone case which effectively protects the telephone from water damage. Accordingly, the telephone cover encases the telephone within a substantially waterproof or water-impervious casing, which thereby will prevent water from penetrating the telephone at least during a brief drop into water, and will in fact cause the telephone to float, so that it may be quickly retrieved.

It is a still further object of the invention that despite the significant protection the case provides to the telephone, the case does not interfere with the functionality of the telephone. Accordingly, provisions are provided for allowing access to the keypad, display, speaker, and microphone of the telephone during usage of the telephone, while protecting the same from damage.

The invention is a cellular telephone casing, for enclosing and protecting a cellular telephone without interfering with the normal functionality of the cellular telephone, the casing having walls made of vinyl covered foam which define an interior volume for fully enclosing the cellular telephone in a substantially waterproof protective covering. The casing has speaker wells and microphone wells which allow uninhibited communication with the telephone through the casing, but are selectively filled with a speaker plug and microphone plug when the telephone is not in use to maintain waterproofing of the casing. At least one transparent window is provided to allow buttons of the telephone to be operated and displays to be visualized. A top split and side splits allow the cellular telephone to be inserted into the casing, and an overhead strap and side straps selectively maintain the top split and side splits closed to maintain waterproofing of the case.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a front perspective view of the cellular telephone case of the present invention, open and ready to have a cellular telephone inserted thereinto.

FIG. 2 is a is rear perspective view of the cellular telephone case, illustrating the belt clip and the side securing straps which mate with the overhead securing strap.

FIG. 3 is a cross sectional view, taken generally in the area of line 3—3 in FIG. 1, illustrating the vinyl coated foam construction of the case housing, wherein the relative positioning of the cellular telephone used in conjunction with the case is shown in phantom lines.

FIG. 4 is a front elevational view, illustrating the telephone fully within the case, the telephone illustrated in phantom.

FIG. 5 is a top plan view, illustrating the cellular telephone case effectively closed and sealed, with the side securing straps mated with and holding the overhead securing strap.

FIG. 6 is a side elevational view, illustrating how the speaker and microphone plugs are easily removable by the user from the speaker and microphone wells when the telephone is actually in use.

FIG. 7 and FIG. 8 is a temporal sequence, illustrating how once the telephone is within the case, the overhead securing straps and side securing straps are mated to seal the case.

DETAILED DESCRIPTION OF THE PREFERRED EMBODIMENTS

Figure 8:
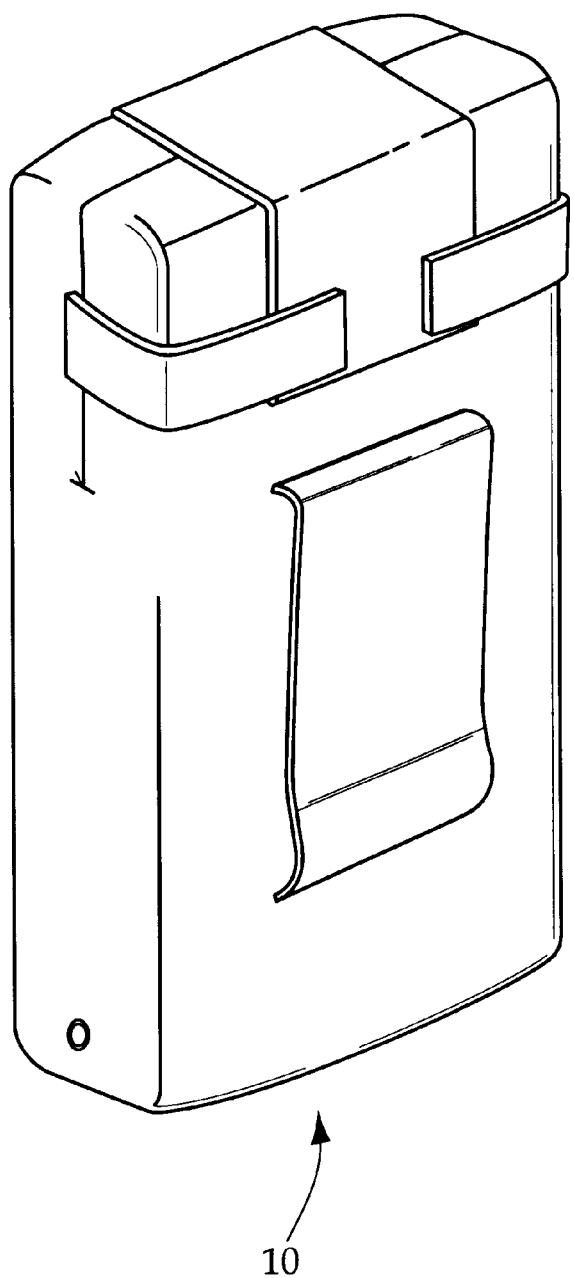

FIG. 1 and FIG. 2 illustrates a casing 10, having casing walls, which include a front 10F and a rear 10R, a bottom 10B, sides 10S, and a top 10T. The casing 10 defines an interior volume 12 which is accessible near the top 10T. In this regard, the casing 10 has a top split 14 and a pair of side splits 16 which extend downward from the top split 14. The casing 10 is substantially the shape of a rectangular prism, wherein the interior volume 12 is sized and shaped to accommodate a cellular telephone. A belt clip 17 is attached on the rear 10R of the casing 10 to allow the case to be clipped onto a user's belt, pocket, or other garment surface.

Referring momentarily to FIG. 3, the casing is made of a foam material 18, which is covered with a smooth, shiny, waterproof vinyl coating 20. In this regard, the coating 20 covers the foam material 18 both outside the casing 10 and within. Accordingly the casing 10 has a consistency similar to commonly available "floating key chains" and the like. With such an arrangement, the casing 10 is both soft, so as to absorb impacts, waterproof, and even stain resistant. The walls of the casing are all of substantially uniform thickness, which is preferably 3/16" in thickness, but can vary according to the cellular telephone design and the degree of protection desired.

However, in furtherance of maintaining functionality of the cellular telephone while encased within the casing 10, several adaptations are provided which interrupt the continuity of the vinyl coated foam casing 10. In particular, one or more transparent windows 22 are provided at the front 10F. The transparent windows 22 are made of a thin, flexible, plastic membrane, which can both allow buttons of the cellular telephone to be operated therethough, and allow informational displays of the cellular telephone to be visualized. Accordingly, the particular configuration of the transparent windows 22 may be made in accordance with selected or common cellular telephone designs so as to allow buttons to be pressed and status displays to be read without removing the telephone from the casing.

Still further, the casing 10 has adaptations for selectively protecting speaker and microphone components of the cellular telephone, while allowing their effective use while the cellular telephone is in use. Accordingly, best seen in FIG. 4, a speaker well 24 and a microphone well 26 is provided near the top 10T and bottom 10B, respectively, which extend fully through the casing 10 and are positioned to provide direct access to the speaker and microphone of the cellular telephone within the casing 10. However, to preserve the waterproof or water-impervious characteristics of the housing, a speaker plug 25 and microphone plug 27 selectively fill the speaker well 24 and microphone well 26. The speaker plug 25 and microphone plug 27 are made of the same vinyl covered foam, and are sized to fit tightly within the speaker well 24 and microphone well 26 with an interference fit. Accordingly, a waterproof or at least water-impervious seal is created therebetween. The speaker plug 25 and the microphone plug 27 are each hingeably connected to the casing 10 immediately adjacent to the speaker 24 and microphone well 26 with a plug strap 28. The plug strap allows the plugs 25 and 27 to be selectively removed from the wells 24 and 26 while remaining attached immediately adjacent thereto, as seen in FIG. 6. However, when located within the wells 24 and 26 between usages of the cellular telephone, the plugs 25 and 27 are substantially flush with the front 10F of the casing 10.

Referring once again to FIG. 1 and FIG. 2, the top split 14 and side splits 16 are provided to allow the user to insert the cellular telephone into the casing 10, and remove said telephone when desired. Accordingly, due to the softness and flexibility of the vinyl coated foam of the casing 10, the splits 14 and 16 allow a significant top opening to be created to allow insertion of the telephone downward into the interior volume 12 of the casing 10. Once fully within the casing 10, it is desirable to seal said casing 10 around the telephone. Accordingly, an overhead securing strap 30 extends from the top 10T front 10F of the casing 10, has a free end 31 which extends rearward therefrom. The overhead securing strap 30 has an outer surface 32 which has a closure component 34 thereon near the free end 31, which as illustrated may be one or more area of hook and loop fastener material. When the overhead securing strap 30 is pulled over the top 10T of the casing and downward behind the casing 10 it effectively closes the top split 14 and side splits 16. Along the splits 14 and 16, the casing is similarly coated with the vinyl material 20 and thus has a tendency to stick together. However a pair of side securing straps 36 extend from the sides 10S of the casing 10 near the front 10F, adjacent to the side splits 16, and have a free end 37 opposite therefrom. The side securing straps 36 extend across the side splits 16 and continue rearwardly therefrom to the rear 10R of the casing 10. Closure components 34 are locate on each of the side securing straps 36 near their free ends 37. As illustrated in FIG. 7, the closure components 34 on the side securing straps 36 are mateable with the closure components 34 on the overhead securing strap 30 to tightly close the side splits 16 and top split 14, so as to close the casing 10 and effect a waterproof or water-impervious seal. To this end, hook and loop fastener material on the side securing straps 36 and the overhead strap 30 join to securing keep the top split 14 and side splits 16 closed, as seen in FIG. 5 and FIG. 6.

To remove the cellular telephone from the case, the side securing straps 36 are simply disengaged from the overhead strap 30, allowing the side splits 16 and top split 14 to widen to allow the cellular telephone to be lifted upward through the top 10T of the casing.

In conclusion, herein is presented a system for effectively allowing a cellular telephone to be protected within a casing, while not interfering with the functionality of the telephone. In this regard, the invention is illustrated by example in the foregoing drawings. Numerous variations are possible, including variations dictated by ensuring compatibility with cellular telephone of various configurations both presently and prospective. Such variations are contemplated as being a part of the present invention.

What is claimed is:

1. A cellular telephone casing, for housing and protecting cellular telephone, having a speaker, comprising:
   a top, a bottom, a pair of sides, a front, and a rear, defining a substantially rectangular prism made of a soft foam material covered a vinyl material, and defining an interior volume capable of fully containing the cellular telephone, therein, the top having a split which flexes open for allowing the cellular telephone to be inserted therein and is normally closed, the casing substantially waterproof when closed;

at least one transparent window, interrupting the continuity of the front of the casing, the transparent window made of a flexible material which allows buttons of the telephone to be operated therethrough;

a speaker well, representing a hole in the foam and vinyl casing to correspond with the speaker of the cellular telephone so as to allow uninhibited communication with said speaker therethrough; and a speaker plug, sized to fit the speaker well, selectively removable from the speaker well to allow uninhibited communication with the speaker, and selectively filling the speaker well with an interference fit, so as to maintain the substantially waterproof characteristics of the casing.

2. The cellular telephone casing as recited in claim 1, wherein the split further comprises a top split and a pair of side splits, and further comprising:

an overhead strap extending from the top surface and selectively extending across the top split to close said top split and toward the rear of the casing; and a pair of side straps, the side straps each extend from the sides of the casing and selectively extend across the side splits to close the side splits.

3. The cellular telephone casing as recited in claim 2, wherein the overhead strap and side straps have fastener components which are selectively mateable, so that the side straps selectively engage the overhead strap to securely maintain the top split and side splits closed.

4. The cellular telephone casing as recited in claim 3, wherein the cellular telephone has a microphone; wherein the front of the casing further has a microphone well which allows uninhibited communication with the microphone therethrough; and the casing further has a microphone plug, sized to fit the speaker well with an interference fit for selectively filling the speaker well with an interference fit, so as to maintain the substantially waterproof characteristics of the casing.

5. The cellular telephone casing as recited in claim 4, further comprising a pair of plug straps, such that one of the plug straps attach the speaker plug to the casing front and the other of the plug straps attach the microphone plug to the casing front so that the microphone plug and speaker plug remain attached to the casing front when they are removed from the microphone well and speaker well respectively.

6. The cellular telephone casing as recited in claim 5, wherein the foam walls of the casing have a thickness of substantially $3/16''$ and wherein the speaker plug and microphone plug have a thickness of substantially $3/16''$ so that said speaker plug and microphone plug are substantially flush with the casing front when within the speaker well and microphone well.

* * * * *